(12) United States Patent
Vellrath

(10) Patent No.: US 9,963,638 B2
(45) Date of Patent: May 8, 2018

(54) UNIVERSAL FIREPROOFING PATCH

(71) Applicant: Timothy Vellrath, Plymouth, CT (US)

(72) Inventor: Timothy Vellrath, Plymouth, CT (US)

( * ) Notice: Subject to any disclaimer, the term of this patent is extended or adjusted under 35 U.S.C. 154(b) by 186 days.

(21) Appl. No.: 13/934,307

(22) Filed: Jul. 3, 2013

(65) Prior Publication Data

US 2015/0010699 A1 Jan. 8, 2015

(51) Int. Cl.

| | | |
|---|---|---|
| *C09K 21/02* | (2006.01) | |
| *E04B 1/94* | (2006.01) | |
| *B65D 81/32* | (2006.01) | |
| *C04B 28/14* | (2006.01) | |
| *C09D 5/18* | (2006.01) | |
| *C04B 111/00* | (2006.01) | |
| *C04B 111/28* | (2006.01) | |

(52) U.S. Cl.
CPC ............. *C09K 21/02* (2013.01); *B65D 81/32* (2013.01); *C04B 28/14* (2013.01); *C09D 5/18* (2013.01); *E04B 1/944* (2013.01); *C04B 2111/00482* (2013.01); *C04B 2111/00525* (2013.01); *C04B 2111/28* (2013.01)

(58) Field of Classification Search
CPC .................................. C08J 9/00; C04B 14/00
USPC ............................................. 521/50; 106/805
See application file for complete search history.

(56) References Cited

U.S. PATENT DOCUMENTS

| | | | | |
|---|---|---|---|---|
| 1,876,122 A | * | 9/1932 | Wood ....................... | C04B 28/10 106/800 |
| 3,372,040 A | * | 3/1968 | Ware ........................ | C04B 22/16 106/18.11 |
| 3,961,972 A | * | 6/1976 | Sparlin ................ | C04B 24/2682 106/603 |
| 2003/0125405 A1 | * | 7/2003 | Hilton ....................... | B28C 5/06 521/50 |
| 2005/0241541 A1 | * | 11/2005 | Hohn ..................... | B63H 3/008 106/805 |

OTHER PUBLICATIONS

Unknown, Redi-Mud, 2010, www.redi-mud.com/Redi-mud.pdf.*

* cited by examiner

*Primary Examiner* — Dah-Wei D Yuan
*Assistant Examiner* — Andrew Bowman

(57) ABSTRACT

Techniques and methods are disclosed for facilitating the fireproofing application process to the structural members of buildings (e.g., houses, apartment buildings, office buildings, sky-rises, etc.) and for improving the structural integrity of steel when exposed to extreme temperatures. The components of the Universal Fireproofing Patch provide a fireproofing protection product that exceeds Underwriters Laboratories fireproofing guidelines, which may be used under any circumstances (i.e., in the event the existing material to be fire-patched is either unknown or unavailable). The components of the Universal Fireproofing Patch enable a user the ability to coat a non-conforming area quickly, easily and for a fraction of the price compared to commercial patching services. Finally, the Universal Fireproofing Patch is sold as a kit that is comprised of a container, a premeasured quantity of water and fireproofing mix, a mixer, a trowel and an instrument capable of measuring liquids. The container provided in the kit stores the fireproofing mix, serves as a housing for when a user mixes the components together and is readily mobile for transporting purposes.

12 Claims, 3 Drawing Sheets

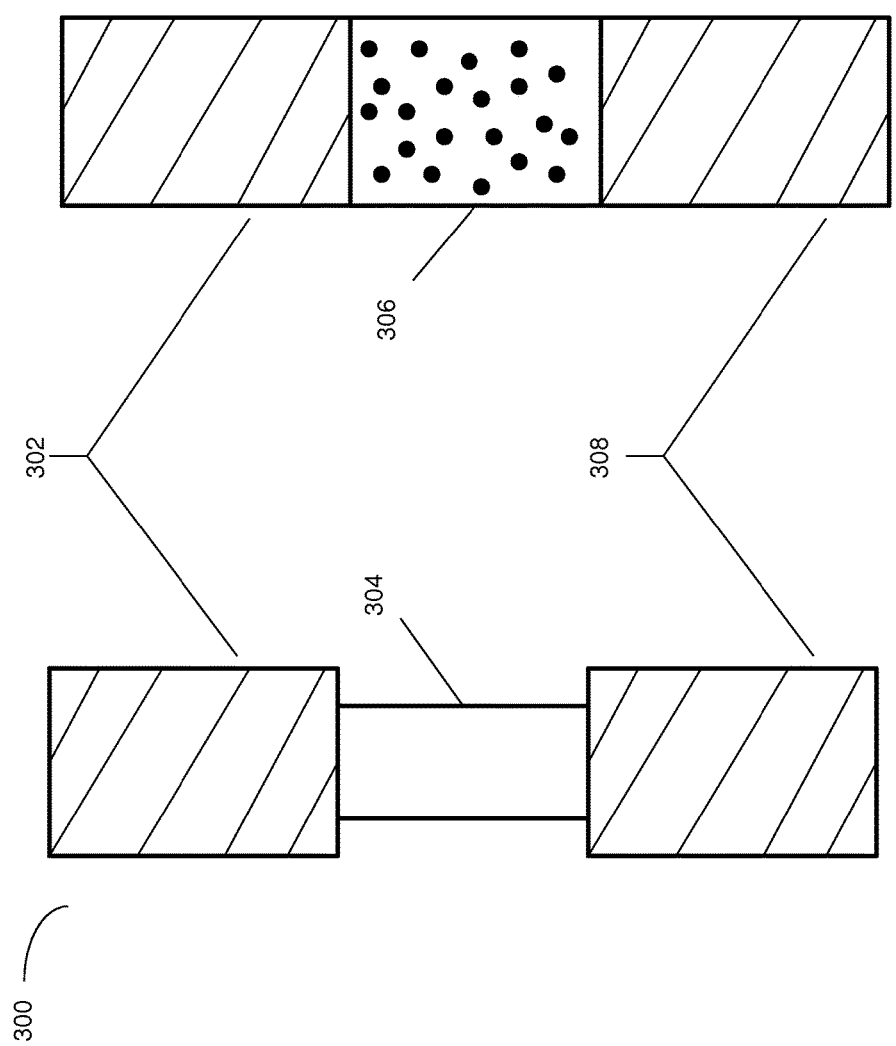

UNIVERSAL FIREPROOFING PATCH

CROSS-REFERENCE TO RELATED APPLICATION

Not applicable.

FIELD OF THE INVENTION

The field relates to construction materials wherein a spreadable or spray-applicable coating composition is applied to the framework of buildings to serve as a fireproofing means.

BACKGROUND

Steel is used practically in all structural formations of buildings raging from all sizes (e.g., house, apartment buildings, office buildings, sky-rises, etc.). When developing such structures, one must be aware of the buildings strength and resistance to heat in the case of a fire. Steel has very unique physical properties in that it has a melting point of about 3,300° F.; however the framework of steel tends to change when susceptible to temperatures of 800° F.-1,200° F. At these temperature ranges, steel tends to twist in a number of directions, sag and most importantly lose most of its structural strength. To be more specific, steel tends to lose about 20% of its design strength at 800° F. Moreover, at 1,200° F., a temperature easily reached in a fire, the steel will lose up to 70% or more of its design strength.

Protecting structural steel from the heat of a fire can be achieved in a plurality of ways. First, the steel can be encased in concrete or substituted masonry materials (e.g., brick, stone, marble, granite, travertine, limestone, cast stone, glass block, stucco, tile, etc.). Unfortunately masonry construction tends to be a slow, expensive process and such materials tend to produce significant weight concerns. Secondly, there are sprinkler systems available, "deluge systems", which supply water over and around the steel members so that heat from a fire never has the opportunity to affect the strength of the protected member. Although the deluge system presents itself as the most effective manner in which to protect the structural integrity of steel, the deluge system creates tremendous water supply and runoff difficulties.

Sprinklers add water, which absorbs heat and tends to control the availability of oxygen, thereby controlling the fire's size and intensity. Compartmentalization (e.g., firestopping) is designed to keep the fire from spreading, from area to area and floor to floor. Structural preservation is the primary design function of spray-applied fire resistant materials.

Spray applied fireproofing is designed to preserve the structural integrity of the "assembly" that it seeks to protect by keeping the substrate, usually steel, at temperatures that are relatively cool (e.g., 350° F. range). This is significantly different from the design intent of active sprinkler systems. Sprinkler systems rely on a water distribution system usually comprised of heavy-duty pipes connected in a rigid system. Head of wall firestopping has a design deflection capability of approximately ¾ of an inch. Obviously, without structural stability both the compartmentalization and the sprinkler systems will fail, which is why the argument for redundancy and balanced fire safety systems is so compelling.

Spray fireproofing consists of a process in which a fire resistant material (e.g., plaster-like materials) is sprayed on steel surfaces. The fire resistive material is designed to keep elevated temperatures away from the steel substrate by converting the captured water within the material to steam, over a specified period of time (e.g., 1 to 4 hours). Supplementing this basic water conversion process compliments additional reactions that contribute to this time delay including for example, reflection or deflection, absorption, self-combustion, and other endothermic reactions. However, for any of them to work the fire resistive material must be applied correctly.

The present invention has been verified by 3 nationally recognized laboratories: 1) VTEC; 2) Intertek; and 3) Underwriters Laboratories. The present invention has passed ASTM E 84 for flame spread and smoke developed, the ASTM E 119 for retention of structural integrity, and the ASTM E 119/UL 263 for thermal resistivity of at least 2 hours.

Underwriters Laboratories (hereinafter referred to as "UL") previously required fireproofing patches to be formulated out of the same materials used in the initial fireproofing coating process. UL additionally requires that the applicator of the fireproofing patch be certified in such field. What is unique about the present invention is that it teaches away from all art that has been previously disclosed while conforming to all UL guidelines at the same time.

The judicious evaluation of fire protective designs and technologies determine the potential for structural collapse, the risk assessment to human life, and the economic liabilities that would be created in the event of a fire.

U.S. Pat. No. 6,746,533 of Ksionzyk discloses a method for increasing the drying rate of set plaster to form fireproofing material consisting essentially of hydrated calcium sulfate hemihydrates, and the method consisting essentially of adding to a drying accelerant to the setting plaster. Additionally, U.S. Pat. No. 5,034,160 of Kindt; U.S. Pat. No. 6,309,740 of Shu et al.; and U.S. Pat. No. 5,556,578 of Berneburg discloses a sprayable cementitious fireproofing composition, however, these references in their entirety and in combination with one another fail to disclose the novel features of the Universal Fireproofing Patch.

Existing methods are labor-intensive and expensive. It would be advantageous to provide a universal patch system that can be used when the existing material is either unknown or unavailable and methods for fireproofing walls, ceilings or floors that require less labor and materials than presently existing methods.

SUMMARY OF THE INVENTION

Principles of the invention relate to construction materials wherein a spreadable or spray-applicable coating composition is applied to the framework of buildings to serve as a fireproofing means.

The deficiencies of the prior art have been overcome and superseded by the present invention, which provides for a inexpensive, easy-to-use spreadable or spray-applicable fireproofing means which exhibits improved thermal performance. A composition that possesses an elevated threshold to thermal intensive environments is comprised of a cementitious aggregate in which a hydrator (e.g., water) is added to create a spreadable or sprayable fireproofing means to be applied to a plurality of substrates.

A novel feature of the present invention pertains to its versatility and universal nature, meaning that it may be applied to any unknown existing materials while maintaining the UL fire rating requirements. The present invention is proven to be fire resistant as well as compatible to all sorts of fire resistive materials and under a plurality of physical and environmental conditions.

In its method aspects, the present invention is substantially directed towards a spreadable or sprayable form wherein the disclosed cementitious composition is easily applied to the targeted structural means by a user. The present invention would be sold as a package, wherein the hydrating means is provided, along with an instrument suitable for measuring the hydrating means and a mixing means for facilitating the consistency of the cementitious aggregate prior to usage.

Another feature of the present invention pertains to its packaging arrangement. The present invention may be sold as a kit comprised of a multifunctional container that serves as a means for transporting, mixing and storing items. The kit is further comprised of a premeasured quantity of a hydrating agent (e.g., water), a mixing member (e.g., dipstick, drill) and premeasured quantity of the fireproofing aggregate. In an alternate embodiment of the present invention a measuring means (e.g., measuring cup) may be provided within the multifunctional container.

These and other objects, features, and advantages of the present invention will become apparent from the following detailed description of illustrative embodiments thereof, which is to be read in connection with the accompanying drawings.

BRIEF DESCRIPTION OF THE DRAWINGS

These and other features and advantages of the present invention will be better and more completely understood by referring to the following detailed description of example non-limiting embodiments in conjunction with the drawings, of which:

FIG. 3A illustrates a steel column prior to UFP coating.

FIG. 3B illustrates a steel column post UFP coating.

DETAILED DESCRIPTION

Various aspects and embodiments of the present invention will now be described in detail with reference to the accompanying figures. Certain terminology is used herein for convenience and is not to be taken as a limitation on the present invention. The terminology includes the words specifically mentioned, derivatives thereof and words of similar import. The embodiments illustrated below are not intended to be exhaustive or to limit the disclosure to the precise form disclosed. These embodiments are chosen and described to best explain the principle of the disclosure and its application and practical use and to enable others skilled in the art to best utilize the invention.

Figure 1:
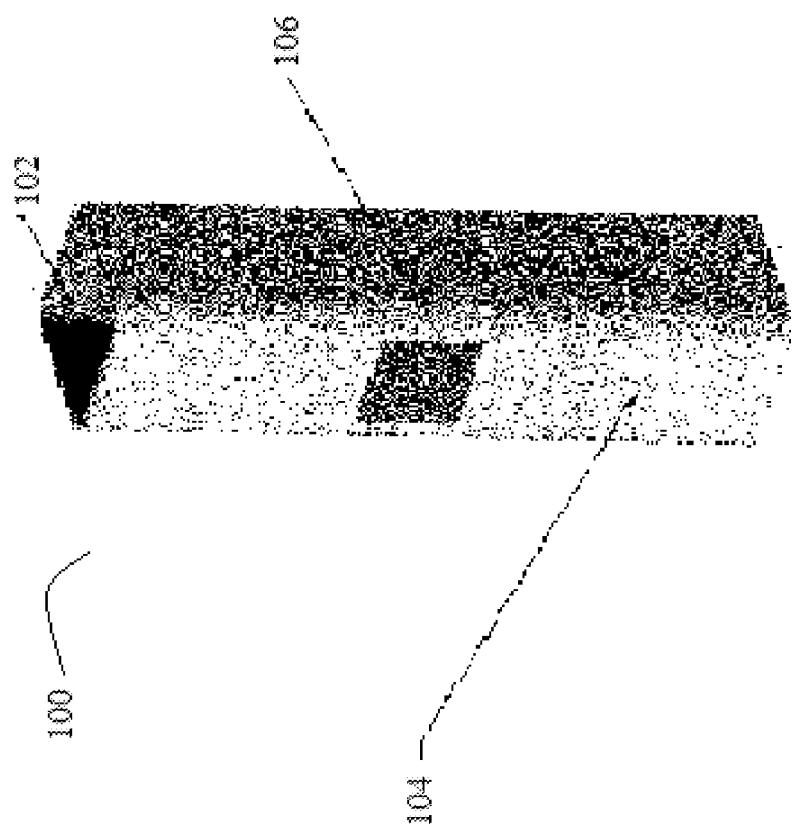
FIG. 1 illustrates an embodiment of the universal fireproofing patch.

FIG. 1 illustrates a perspective view of a Universal fireproofing patch (hereinafter "UFP") as applied to a substrate 100. UFP 106 is manufactured in a spreadable or sprayable form. UFP 106 is applied to a substrate (e.g., metal, concrete, composite materials, or mixtures thereof) as a repairing, supporting and bonding means. UFP 106 is manufactured, packaged and sold as a dry-mix. The directions of UFP 106 require the user to add a hydrating agent (e.g., water) in a 1:1 ratio in order to transform the dry powder mix to a usable form. The user then mixes the dry-mix with the hydrating agent until a slurry mixture forms. Once the slurry mixture forms, the user may then apply UFP 106 to a substrate via an applicator means capable of spreading or spraying.

Structural steel member 102 (e.g., column, beam, joist, girt or corrugated steel decking) is placed in the field, which currently has cementitious spray 104 applied. The physical condition of cementitious spray 104 has deteriorated over time, therefore, making it necessary for a repair or patch to be made. Under such circumstances, a user applies UFP 106 to the non-conforming area. Applicator applies UFP 106 to steel member 102 at a thickness equivalent to that of which cementitious spray 104 had been applied at an earlier date. UFP 106 must consist of a continuous cementitious fireproofing patch that is measured at a maximum of 3 square feet. Furthermore, a minimum of 12 inches of cementitious spray 104 must remain between each non-conforming area repaired with UFP 106. UFP 106, when applied in such a manner as described above, exceeds the 2 hour fireproofing requirements as required by the UL.

Example I

The universal fireproofing patch compositions tested in accordance with the present invention is comprised of the following formulation:

| Material | Amount (% by weight) |
| --- | --- |
| Gypsum Plaster | 70-76 |
| Limestone | 7-8 |
| Elotex ADO 100 | 1-10 |
| Plast Retard PE | 1-10 |
| Tylose PH 60000 P6 | 1-10 |
| Zinc Omadine Powder | 1-10 |
| Stephanol WA 100 NF USP | 1-10 |
| Glass Fiber ½" Chop | 1-10 |
| Vermiculite D-3 | 6-9 |
| Ground Cellulose | 4-6 |

Figure 2:
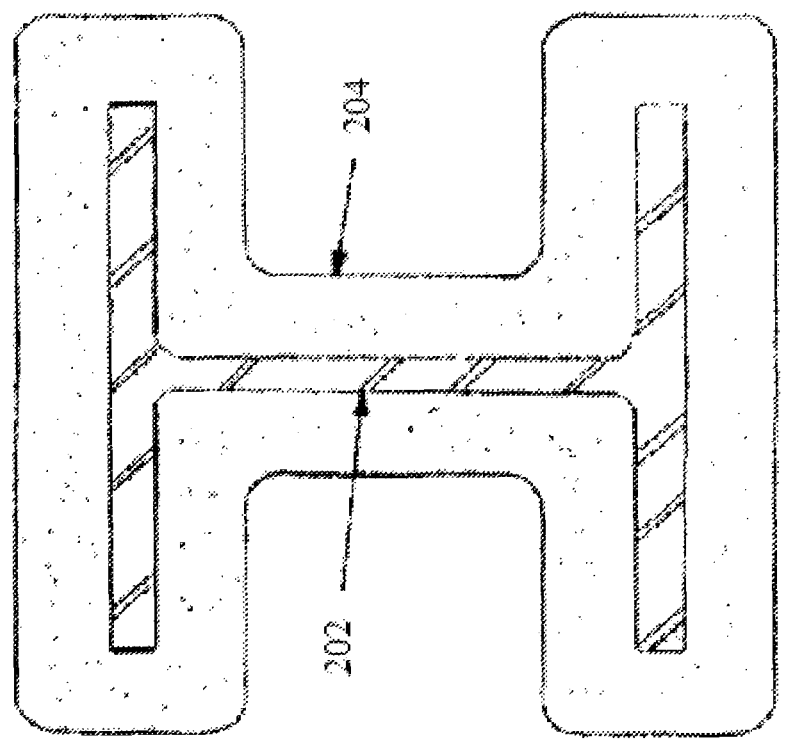
FIG. 2 illustrates a structural apparatus used to evaluate the quality of the thermal resistive materials.

FIG. 2 illustrates the structural apparatus used to evaluate the quality of the thermal resistive materials. FIG. 3A illustrates structural apparatus 200 prior to UFP coating. FIG. 3B illustrates structural apparatus 200 post UFP coating. Structural apparatus 200 was comprised of five (5), 5' long, 8"×8"×0.375 RHS steel selections 202 which were instrumented with thermocouples. None of steel sections 202 were sand blasted or acid washed prior to material application. The five steel sections were cleaned using a wire brush. Once cleaned, insulation blocks 304 were installed around the center of the outer surface of each column to protect a 15" high band, then each column was coated with one of the 5 spray-applied fire protective materials (e.g., Cafco® 300; Monokote® MK-6®HY®; Southwest Type 7GP™; Southwest Type 5 MD; BlazeShield® II) (thickness to be appropriate for the steel section and for a 2 hour fire resistance rating), in accordance with the manufacturer's instructions.

Once the coatings had dried, the insulation blocks 304 were removed leaving the 15" high band of bare steel at the center height of the steel section, yielding a total area of 15"×29.4=441 in$^2$=2.069 ft$^2$. The patch system material 306 was spray-applied, then smoothed with a trowel to the same thickness as the surrounding SFPM.

The give columns were capped on both ends using a lightweight concrete mix, leaving 48" of each column exposed. A nominal ½" gap between the SPFM coating and the caps (at the top of each column) was filled with Monokote® MK-6®HY®, level with SPFM coating, then wrapped with a 3" wide strip of 2" thick ceramic blanket, which was secured with ½" wide steel banding.

In order to evaluate the adhesion and cohesion of the UFP for Structural Steel Fire Protection, a sixth 5' long 8"×8"× 0.375 RHS steel section, without thermocouples, was coated with only the UFP to a nominal thickness of 1¼". Both ends of the beam were plugged and wrapped with 2" ceramic fiber and with Monokote® MK-6®HY®, then secured with ½" wide steel banding.

The inner surfaces of each steel section 202 of the columns were instrumented with a total of twelve (12) Inconel sheathed thermocouples, divided into three levels, 3-6-3. The thermocouples were installed at mid-depth of each of the 5 columns. The output of the thermocouples and the furnace probes were monitored by a 300-channel Yokogawa, Inc., Darwin Data Acquisition Unit. The computer was programmed to scan and save data every 30 seconds. The test results, shown at 10 minute intervals (to conserve space while providing an idea of UFP's thermal resistance), are provided below in Tables 1-15.

The five columns were installed in the full scale horizontal furnace on pedestals such that each sample was restrained between the furnace floor and the furnace lid; the single beam was mounted horizontally, supported by two solid CMUs with a bearing distance of 48" on each end.

As depicted by Tables 1-15 of Examples II-VI, the UFP remained intact with no delaminating, slippage or sagging in the UFP material at the interface between the UFP material and any of the other protective materials. The thermal protection of the steel afforded by the UFP was superior to all of the other protective materials until the excessive axial conductive heat flow occurred.

Example II

Tables 1-3 below depict the thermal resistance of Cafco® 300 and the UFP. Cafco® 300 was applied at two distinct locations of the testing column (i.e., Level 1 and Level 3) and the UFP was applied to Level 2.

TABLE 1

Cafco ® 300
Level 1

| Time (min) | Average Temp. (° F.) | Max Temp. (° F.) |
| --- | --- | --- |
| 0 | 70 | 70 |
| 10 | 104 | 109 |
| 20 | 160 | 168 |
| 30 | 205 | 207 |
| 40 | 258 | 290 |
| 50 | 424 | 479 |
| 60 | 628 | 734 |
| 70 | 878 | 1043 |
| 80 | 1078 | 1229 |
| 90 | 1219 | 1340 |
| 100 | 1327 | 1430 |
| 110 | 1410 | 1512 |
| 120 | 1480 | 1574 |

TABLE 2

Cafco ® 300 with UFP
Level 2

| Time (min) | Average Temp. (° F.) | Max Temp. (° F.) |
| --- | --- | --- |
| 0 | 70 | 70 |
| 10 | 98 | 104 |

TABLE 2-continued

Cafco ® 300 with UFP
Level 2

| Time (min) | Average Temp. (° F.) | Max Temp. (° F.) |
| --- | --- | --- |
| 20 | 157 | 161 |
| 30 | 203 | 204 |
| 40 | 208 | 209 |
| 50 | 234 | 245 |
| 60 | 312 | 330 |
| 70 | 449 | 465 |
| 80 | 596 | 608 |
| 90 | 743 | 753 |
| 100 | 884 | 894 |
| 110 | 1009 | 1018 |
| 120 | 1118 | 1127 |

TABLE 3

Cafco ® 300
Level 3

| Time (min) | Average Temp. (° F.) | Max Temp. (° F.) |
| --- | --- | --- |
| 0 | 70 | 70 |
| 10 | 109 | 114 |
| 20 | 166 | 171 |
| 30 | 207 | 208 |
| 40 | 243 | 250 |
| 50 | 328 | 337 |
| 60 | 420 | 425 |
| 70 | 510 | 519 |
| 80 | 603 | 616 |
| 90 | 697 | 711 |
| 100 | 787 | 798 |
| 110 | 868 | 874 |
| 120 | 942 | 949 |

Example III

Tables 4-6 below depict the thermal resistance of Monokote® MK-6®HY® and the UFP. Monokote® MK-6®HY® was applied at two distinct locations of the testing column (i.e., Level 1 and Level 3) and the UFP was applied to Level 2.

TABLE 4

Monokote ® MK-6 ®HY ®
Level 1

| Time (min) | Average Temp. (° F.) | Max Temp. (° F.) |
| --- | --- | --- |
| 0 | 69 | 69 |
| 10 | 78 | 80 |
| 20 | 111 | 113 |
| 30 | 152 | 154 |
| 40 | 193 | 198 |
| 50 | 232 | 270 |
| 60 | 428 | 640 |
| 70 | 745 | 1086 |
| 80 | 1013 | 1333 |
| 90 | 1205 | 1448 |
| 100 | 1345 | 1532 |
| 110 | 1440 | 1608 |
| 120 | 1528 | 1667 |

TABLE 5

Monokote ® MK-6 ®HY ® with UFP
Level 2

| Time (min) | Average Temp. (° F.) | Max Temp. (° F.) |
|---|---|---|
| 0 | 70 | 70 |
| 10 | 84 | 92 |
| 20 | 130 | 137 |
| 30 | 176 | 181 |
| 40 | 203 | 205 |
| 50 | 208 | 212 |
| 60 | 221 | 230 |
| 70 | 273 | 287 |
| 80 | 365 | 387 |
| 90 | 514 | 533 |
| 100 | 674 | 692 |
| 110 | 830 | 847 |
| 120 | 974 | 989 |

TABLE 6

Monokote ® MK-6 ®HY ®
Level 3

| Time (min) | Average Temp. (° F.) | Max Temp. (° F.) |
|---|---|---|
| 0 | 70 | 70 |
| 10 | 79 | 80 |
| 20 | 112 | 114 |
| 30 | 155 | 157 |
| 40 | 192 | 193 |
| 50 | 207 | 216 |
| 60 | 263 | 285 |
| 70 | 348 | 384 |
| 80 | 448 | 498 |
| 90 | 553 | 611 |
| 100 | 657 | 709 |
| 110 | 755 | 796 |
| 120 | 849 | 881 |

Example IV

Tables 7-9 below depict the thermal resistance of Southwest Type 7GP™ and the UFP. Southwest Type 7GP™ was applied at two distinct locations of the testing column (i.e., Level 1 and Level 3) and the UFP was applied to Level 2.

TABLE 7

Southwest Type 7GP ™
Level 1

| Time (min) | Average Temp. (° F.) | Max Temp. (° F.) |
|---|---|---|
| 0 | 70 | 70 |
| 10 | 89 | 92 |
| 20 | 140 | 144 |
| 30 | 183 | 190 |
| 40 | 209 | 210 |
| 50 | 222 | 234 |
| 60 | 286 | 303 |
| 70 | 393 | 409 |
| 80 | 526 | 538 |
| 90 | 668 | 677 |
| 100 | 809 | 814 |
| 110 | 939 | 943 |
| 120 | 1056 | 1059 |

TABLE 8

Southwest Type 7GP ™ with UFP
Level 2

| Time (min) | Average Temp. (° F.) | Max Temp. (° F.) |
|---|---|---|
| 0 | 70 | 70 |
| 10 | 82 | 89 |
| 20 | 130 | 138 |
| 30 | 176 | 184 |
| 40 | 205 | 208 |
| 50 | 209 | 210 |
| 60 | 217 | 227 |
| 70 | 266 | 275 |
| 80 | 329 | 348 |
| 90 | 441 | 454 |
| 100 | 554 | 566 |
| 110 | 665 | 679 |
| 120 | 771 | 786 |

TABLE 9

Southwest Type 7GP ™
Level 3

| Time (min) | Average Temp. (° F.) | Max Temp. (° F.) |
|---|---|---|
| 0 | 70 | 70 |
| 10 | 89 | 91 |
| 20 | 142 | 145 |
| 30 | 192 | 195 |
| 40 | 211 | 211 |
| 50 | 217 | 223 |
| 60 | 277 | 284 |
| 70 | 340 | 345 |
| 80 | 401 | 405 |
| 90 | 462 | 466 |
| 100 | 524 | 527 |
| 110 | 587 | 589 |
| 120 | 649 | 651 |

Example V

Tables 10-12 below depict the thermal resistance of Southwest Type 5 MD and the UFP. Southwest Type 5 MD was applied at two distinct locations of the testing column (i.e., Level 1 and Level 3) and the UFP was applied to Level 2.

TABLE 10

Southwest Type 5 MD
Level 1

| Time (min) | Average Temp. (° F.) | Max Temp. (° F.) |
|---|---|---|
| 0 | 70 | 70 |
| 10 | 93 | 100 |
| 20 | 136 | 143 |
| 30 | 178 | 187 |
| 40 | 207 | 211 |
| 50 | 241 | 271 |
| 60 | 349 | 377 |
| 70 | 534 | 603 |
| 80 | 772 | 896 |
| 90 | 970 | 1079 |
| 100 | 1118 | 1204 |
| 110 | 1232 | 1302 |
| 120 | 1317 | 1369 |

TABLE 11

Southwest Type 5 MD with UFP
Level 2

| Time (min) | Average Temp. (° F.) | Max Temp. (° F.) |
|---|---|---|
| 0 | 70 | 70 |
| 10 | 81 | 85 |
| 20 | 125 | 128 |
| 30 | 172 | 175 |
| 40 | 205 | 207 |
| 50 | 212 | 217 |
| 60 | 230 | 244 |
| 70 | 283 | 296 |
| 80 | 376 | 388 |
| 90 | 511 | 518 |
| 100 | 649 | 657 |
| 110 | 782 | 791 |
| 120 | 907 | 915 |

TABLE 12

Southwest Type5 MD
Level 3

| Time (min) | Average Temp. (° F.) | Max Temp. (° F.) |
|---|---|---|
| 0 | 70 | 70 |
| 10 | 95 | 97 |
| 20 | 141 | 142 |
| 30 | 187 | 188 |
| 40 | 209 | 210 |
| 50 | 229 | 230 |
| 60 | 284 | 285 |
| 70 | 354 | 357 |
| 80 | 426 | 433 |
| 90 | 500 | 508 |
| 100 | 575 | 583 |
| 110 | 648 | 656 |
| 120 | 721 | 728 |

Example VI

Tables 13-15 below depict the thermal resistance of BlazeShield® II and the UFP. BlazeShield® II was applied at two distinct locations of the testing column (i.e., Level 1 and Level 3) and the UFP was applied to Level 2.

TABLE 13

BlazeShield® II
Level 1

| Time (min) | Average Temp. (° F.) | Max Temp. (° F.) |
|---|---|---|
| 0 | 70 | 70 |
| 10 | 93 | 98 |
| 20 | 131 | 140 |
| 30 | 171 | 180 |
| 40 | 207 | 221 |
| 50 | 270 | 296 |
| 60 | 349 | 387 |
| 70 | 464 | 519 |
| 80 | 616 | 679 |
| 90 | 779 | 841 |
| 100 | 931 | 981 |
| 110 | 1063 | 1105 |
| 120 | 1176 | 1211 |

TABLE 14

BlazeShield® II with UFP
Level 2

| Time (min) | Average Temp. (° F.) | Max Temp. (° F.) |
|---|---|---|
| 0 | 70 | 70 |
| 10 | 81 | 84 |
| 20 | 121 | 124 |
| 30 | 165 | 168 |
| 40 | 201 | 202 |
| 50 | 210 | 211 |
| 60 | 227 | 235 |
| 70 | 282 | 296 |
| 80 | 368 | 404 |
| 90 | 495 | 531 |
| 100 | 624 | 655 |
| 110 | 749 | 774 |
| 120 | 866 | 888 |

TABLE 15

BlazeShield® II
Level 3

| Time (min) | Average Temp. (° F.) | Max Temp. (° F.) |
|---|---|---|
| 0 | 70 | 70 |
| 10 | 91 | 93 |
| 20 | 130 | 133 |
| 30 | 181 | 185 |
| 40 | 230 | 238 |
| 50 | 299 | 306 |
| 60 | 370 | 375 |
| 70 | 429 | 433 |
| 80 | 485 | 491 |
| 90 | 544 | 554 |
| 100 | 608 | 619 |
| 110 | 675 | 684 |
| 120 | 742 | 750 |

It should again be emphasized that the above-described embodiments of the invention are not presented for purposes of illustration only. Many variations may be made in the particular arrangements shown. For example, although described in the context of particular article of manufacture and methods, the techniques are applicable to a wide variety of other types of structural preserving embodiments. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A universal fireproofing patch composition comprising: a fireproofing aggregate wherein the fireproofing aggregate is formulated in a spreadable form to repair, patch, support, and bond to a substrate and existing Spray Applied Fire-Resistive Materials, the fireproofing aggregate comprising; a plurality of cementitious binding agents, wherein the binding agents consists essentially of 70-76 wt % Gypsum, 7-8 wt % Limestone, 6-9 wt % Vermiculite, 4-6 wt % Ground Cellulose; and the fireproofing aggregate further comprising 1-10 wt % light-weight aggregate comprising a polyvinyl alcohol binding agent, a retardant, a gumming additive, a fungicide, a surfactant, and Glass Fiber ½" Chop.

2. The composition of claim 1, wherein the substrate is comprised of metal, concrete, composite materials, or mixtures thereof.

3. The composition of claim 1, wherein the fireproofing aggregate is applied to a substrate via a spray-applicator means.

4. The composition of claim 1, wherein the fireproofing aggregate is comprised of a plurality of binding agents in dry-mix form.

5. The composition of claim 1, wherein the fireproofing aggregate further comprises water whereby the dry-mix transforms into a slurry form that is sprayable onto a substrate by a user via an applicator means.

6. The composition of claim 1, wherein the fireproofing aggregate is formulated preserve the structural formation and composition of a substrate for a period of time of at least 120 minutes in the event of a fire.

7. A multifunctional container kit, further comprising the universal fireproofing patch composition of claim 1.

8. The multifunctional container kit of claim 7, wherein the kit serves as a means for storing, transporting, and mixing a plurality of ingredients, comprising:
   a premeasured quantity of a hydrating agent comprising a fluid;
   a mixing member located external to the hydrating agent;
   a fireproofing aggregate applicator located external to the hydrating agent; and
   a premeasured quantity of a fireproofing aggregate located external to the premeasured hydrating agent, the first and second quantities being determined in-part according to product mix ratio; wherein:
   the hydrating agent, mixing member, and fireproofing aggregate applicator are affixed to an exterior surface of the multifunctional container by use of a flexible, acrylic-based adhesive, wherein the mixing member facilitates a user to perform a mixing operation when the hydrating agent and the fireproofing aggregate are mixed and wherein the fireproofing aggregate applicator facilitates the coating of the fireproofing aggregate to a substrate.

9. The composition of claim 1, wherein the universal fireproofing patch is applied as a continuous fireproofing patch measuring a maximum of 3 square feet.

10. The composition of claim 1, wherein the universal fireproofing patch is compatible with existing Spray Applied Fire-Resistive Materials previously applied to a substrate.

11. The composition of claim 10, wherein the universal fireproofing patch does not delaminate, slip, or sag at the interface with the existing Spray Applied Fire-Resistive Materials.

12. The composition of claim 1, wherein the fireproofing aggregate is combined with a hydrating agent in a 1:1 ratio.

* * * * *